(12) United States Patent
Park et al.

(10) Patent No.: US 10,455,474 B2
(45) Date of Patent: Oct. 22, 2019

(54) APPARATUS AND METHOD FOR SUPPORTING MOBILITY OF MOBILE STATION IN WIRELESS COMMUNICATION SYSTEM

(71) Applicant: Samsung Electronics Co., Ltd., Suwon-si, Gyeonggi-do (KR)

(72) Inventors: Jung-Shin Park, Seoul (KR); Rakesh Taori, Suwon-si (KR); Yeong-Moon Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 14/141,977

(22) Filed: Dec. 27, 2013

(65) Prior Publication Data
US 2014/0185435 A1 Jul. 3, 2014

(30) Foreign Application Priority Data
Jan. 2, 2013 (KR) ........................ 10-2013-0000200

(51) Int. Cl.
*H04W 28/10* (2009.01)
*H04W 36/32* (2009.01)
(Continued)

(52) U.S. Cl.
CPC ......... *H04W 36/32* (2013.01); *H04L 47/2433* (2013.01); *H04W 36/0016* (2013.01);
(Continued)

(58) Field of Classification Search
CPC ..... H04W 28/10; H04W 36/32; H04W 36/26; H04W 36/12; H04W 8/06; H04W 36/02; H04W 76/041; H04W 28/08; H04W 36/0011; H04W 72/1242; H04W 72/1247; H04W 84/045; H04L 47/00; H04L 47/10; H04L 47/2433; H04B 7/022
See application file for complete search history.

(56) References Cited

U.S. PATENT DOCUMENTS

2001/0030953 A1 10/2001 Chang
2002/0069278 A1 6/2002 Forslow
(Continued)

FOREIGN PATENT DOCUMENTS

CN 101212810 A 7/2008
CN 102378148 A 3/2012
(Continued)

OTHER PUBLICATIONS

Korean Office Action dated Nov. 19, 2018, issued in the Korean Application No. 10-2013-0000200.
(Continued)

*Primary Examiner* — Vinncelas Louis
(74) *Attorney, Agent, or Firm* — Jefferson IP Law, LLP

(57) ABSTRACT

A Mobile Station (MS) in a wireless communication system is provided. The MS includes, generating a message for requesting to generate a service flow, the message including mobility management information of the service flow, and transmitting the message including the mobility management information. The mobility management information is used to determine whether the service flow requires an anchor.

11 Claims, 12 Drawing Sheets

(51) Int. Cl.
*H04W 72/12* (2009.01)
*H04L 12/851* (2013.01)
*H04W 36/18* (2009.01)
*H04W 36/00* (2009.01)
*H04W 80/04* (2009.01)
*H04W 84/04* (2009.01)

(52) U.S. Cl.
CPC ....... *H04W 36/0033* (2013.01); *H04W 36/18* (2013.01); *H04W 72/1242* (2013.01); *H04W 72/1247* (2013.01); *H04W 80/04* (2013.01); *H04W 84/045* (2013.01)

(56) References Cited

U.S. PATENT DOCUMENTS

| | | | |
|---|---|---|---|
| 2002/0141360 A1* | 10/2002 | Baba | H04W 36/0011 370/331 |
| 2002/0191572 A1 | 12/2002 | Weinstein et al. | |
| 2005/0063330 A1 | 3/2005 | Lee et al. | |
| 2005/0094611 A1 | 5/2005 | Cheong et al. | |
| 2005/0143072 A1* | 6/2005 | Yoon | H04W 36/12 455/436 |
| 2005/0239465 A1 | 10/2005 | Lee et al. | |
| 2006/0162608 A1 | 7/2006 | Dibble | |
| 2008/0123543 A1 | 5/2008 | Do et al. | |
| 2008/0165735 A1* | 7/2008 | Chen | H04W 76/041 370/331 |
| 2008/0242302 A1 | 10/2008 | Pulkkinen et al. | |
| 2010/0177739 A1* | 7/2010 | Huang | H04W 36/02 370/331 |
| 2011/0070907 A1* | 3/2011 | Chou | H04B 7/022 455/507 |
| 2011/0110331 A1 | 5/2011 | Keller et al. | |
| 2011/0149909 A1* | 6/2011 | An | H04L 47/10 370/331 |
| 2011/0216953 A1 | 9/2011 | Callahan et al. | |
| 2013/0028196 A1 | 1/2013 | Zou et al. | |
| 2013/0176988 A1* | 7/2013 | Wang | H04W 28/08 370/331 |

FOREIGN PATENT DOCUMENTS

| | | | | |
|---|---|---|---|---|
| KR | 2001-0098538 A | 11/2001 | | |
| KR | 10-2005-0029112 A | 3/2005 | | |
| KR | 10-2005-0089627 A | 9/2005 | | |
| WO | 2005/084146 A2 | 9/2005 | | |
| WO | WO 2005084146 A2 * | 9/2005 | ........... | H04W 36/26 |
| WO | 2010/075991 A1 | 7/2010 | | |
| WO | 2011/058022 A1 | 5/2011 | | |
| WO | 2012/025007 A1 | 3/2012 | | |

OTHER PUBLICATIONS

Chinese Office Action dated Sep. 12, 2018, issued in the Chinese Application No. 201380069187.4.
Chinese Office Action dated Jan. 8, 2019, issued in Chinese Application No. 201380069187.4.
European Office Action dated Jan. 29, 2019, issued in European Application No. 13870312.9.
Korean Notice of Patent Grant dated May 27, 2019, issued in the Korean Application No. 10-2013-0000200.

* cited by examiner

APPARATUS AND METHOD FOR SUPPORTING MOBILITY OF MOBILE STATION IN WIRELESS COMMUNICATION SYSTEM

CROSS-REFERENCE TO RELATED APPLICATION(S)

This application claims the benefit under 35 U.S.C. § 119(a) of a Korean patent application filed on Jan. 2, 2013 in the Korean Intellectual Property Office and assigned Serial number 10-2013-0000200, the entire disclosure of which is hereby incorporated by reference.

TECHNICAL FIELD

The present disclosure relates to a wireless communication system.

BACKGROUND

To support massive data services, an advanced wireless communication system is considering using a high frequency band, such as millimeter wave. The high frequency band, such as millimeter wave, relatively shortens a communication distance between a Mobile Station (MS) and a Base Station (BS) compared to a conventional wireless communication systems. The MS can also be referred to as a subscriber station.

Due to the reduced communication distance, cell coverage of the BS is decreased and the number of BSs for service coverage of the MS increases. The reduced cell coverage and the increased number of BSs lead to an increase in the number of handovers when the MS moves around, and accordingly signal and system resource consumption greatly rise. Further, the as the number of BSs increases, throughput requirements of an access gateway that is connected to the BS for transmitting data to the BS and managing user service and authentication information increases. Hence, it is not efficient to apply the centralized network architecture to a small-cell environment.

As discussed above, the use of the high frequency resource reduces cell coverage. While the high frequency wideband and small cell increases the data rate, the number of handovers and the system load increases. As a result, it is required to lessen the number of handovers and the system load.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure to provide an apparatus and a method for increasing system efficiency in a wireless communication system.

Another aspect of the present disclosure is to provide an apparatus and a method for addressing a program caused by high frequency resource in a wireless communication system.

Another aspect of the present disclosure is to provide an apparatus and a method for reducing frequent handover and system load caused by the handover in a wireless communication system.

In accordance with an aspect of the present disclosure, a method for operating a Mobile Station (MS) in a wireless communication is provided. The method includes generating a message for requesting to generate a service flow, the message comprising mobility management information of the service flow, and transmitting the message comprising the mobility management information. The mobility management information is used to determine whether the service flow requires an anchor.

In accordance with another aspect of the present disclosure, a method for operating a Base Station (BS) in a wireless communication is provided. The method includes receiving a message for requesting to generate a service flow, the message comprising mobility management information from an MS, and registering the mobility management information. The mobility management information is used to determine whether the service flow requires an anchor.

In accordance with another aspect of the present disclosure, a method for operating a BS in a wireless communication is provided. The method includes receiving mobility management information of an MS which hands over from other BS, and registering the mobility management information of the MS. The mobility management information of the MS is used to determine whether a service flow requires an anchor.

In accordance with another aspect of the present disclosure, an apparatus of an MS in a wireless communication is provided. The apparatus includes a controller configured to generate a message for requesting to generate a service flow, the message comprising mobility management information of the service flow, and a modem configured to transmit the message comprising the mobility management information. The mobility management information is used to determine whether the service flow requires an anchor.

In accordance with an aspect of the present disclosure, an apparatus of a BS in a wireless communication is provided. The apparatus includes a modem configured to receive a message for requesting to generate a service flow, the message comprising mobility management information from an MS, and a controller configured to register the mobility management information. The mobility management information is used to determine whether the service flow requires an anchor.

In accordance with an aspect of the present disclosure, an apparatus of a BS in a wireless communication is provided. The apparatus includes a backhaul communication part configure to receive mobility management information of an MS which hands over from other BS, and a controller configured to register the mobility management information of the MS. The mobility management information is used to determine whether the service flow requires an anchor.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
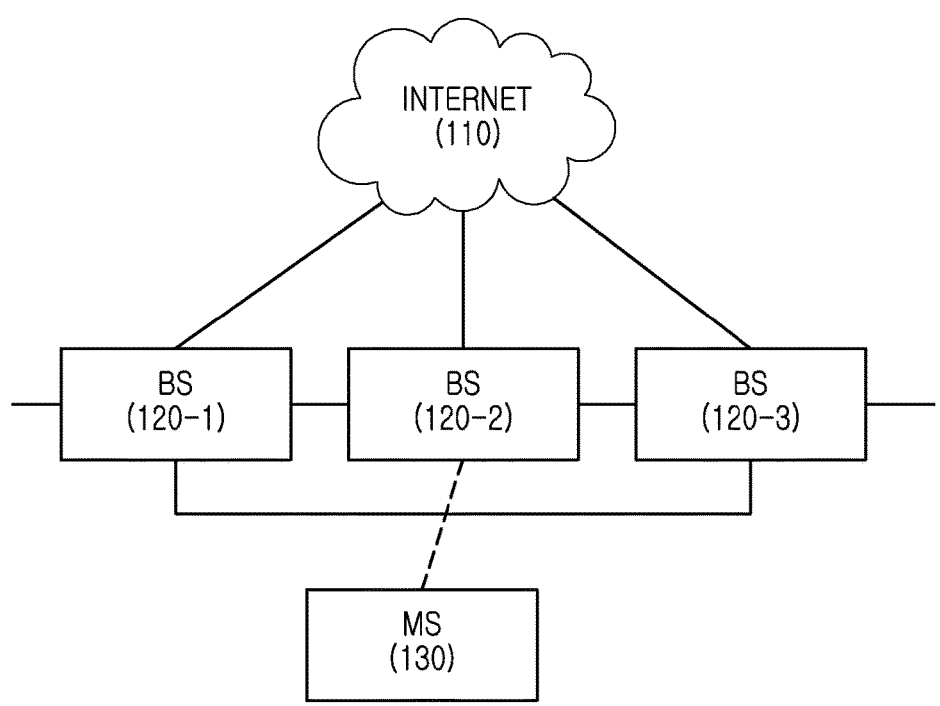
FIG. 1 illustrates a wireless communication system according to an embodiment of the present disclosure.

FIG. 1 is a simplified diagram of a wireless communication system according to an embodiment of the present disclosure.

Referring to FIG. 1, the wireless communication system includes Base Stations (BSs) 120 connected to Internet 110, and a Mobile Station 130 (MS). The BSs 120 are connected directly to the Internet 110 as shown in FIG. 1. The network where the BSs 120 are directly connected to the Internet 110 can be referred to as a flat network. In the flat network, the MS 130 directly receives a data service via one of the BSs 120 without the aid from a separate core network.

The wireless communication system can include a BS controller (not shown) or a gateway (not shown). It is noted that the BS controller or the gateway does not affect the present disclosure. Hereafter, to ease the understanding, it is assumed that the BS controller and the gateway are absent and that the BSs 120 function as the BS controller and the gateway.

Figure 2:
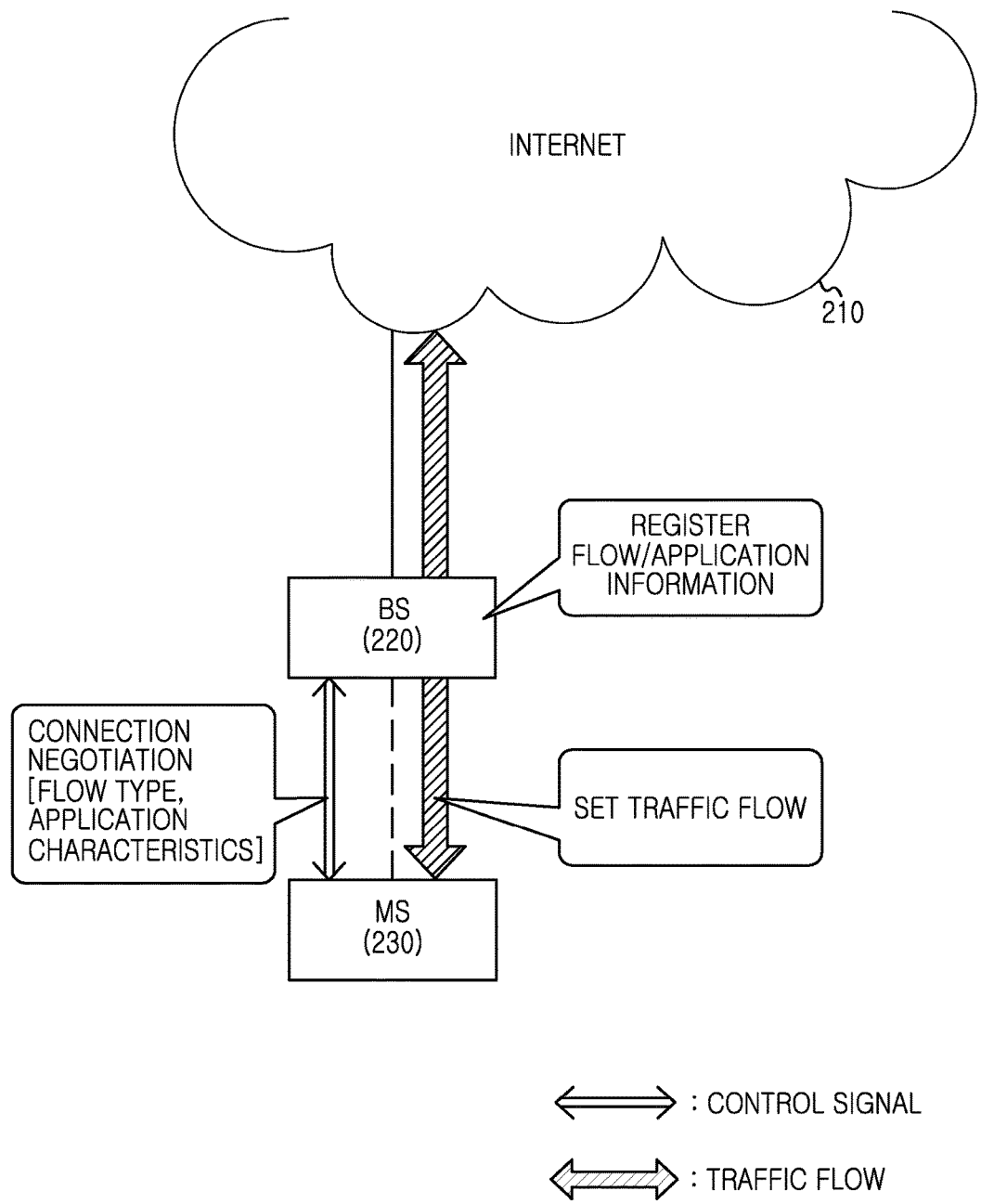
FIG. 2 illustrates flow setup in the wireless communication system according to an embodiment of the present disclosure.

FIG. 2 depicts connection establishment in the wireless communication system according to an embodiment of the present disclosure.

Referring to FIG. 2, an MS 230 performs negotiation with a BS 220 to set a new flow. In the negotiation, the MS 230 provides the BS 220 with flow characteristic information according to requirements for managing mobility of the negotiated flow, and application characteristic information using a control message. Based on the flow characteristic information received in the negotiation with the MS 230, service profile information of a subscriber, and current service information of the MS 230, the BS 220 finally determines whether to accept the request of the MS 230 for the service connection of the corresponding characteristic. Herein, the subscriber service profile indicates range, type, and features of the service permitted per MS 230, and specifies an upper bound of particular service parameters or the number of sessions concurrently allowed per service type. The service profile can relate to a user grade of the MS 230.

When successfully accepting the flow requested through the negotiation, the BS 220 registers the flow characteristic information, that is, flow type, flow mobility management requirements, and application characteristic information of the flow, as management information of the BS 220 so that the MS 230 migrating to other BS can use the accepted flow for connection management between the MS and the BS. Namely, the BS 220 stores and utilizes the information specifying the flow characteristics of the flow of the successfully accepted connection establishment together with other parameter information, so as to determine the connection management when the MS 230 migrates.

Next, if necessary, the BS 220 sets an additional route for transmitting a packet received from the MS 230 over the flow, to the Internet 210. The flow generated as above, to allow an application of the MS to communicate over the Internet 210, can be referred to as a service flow.

Figure 3:
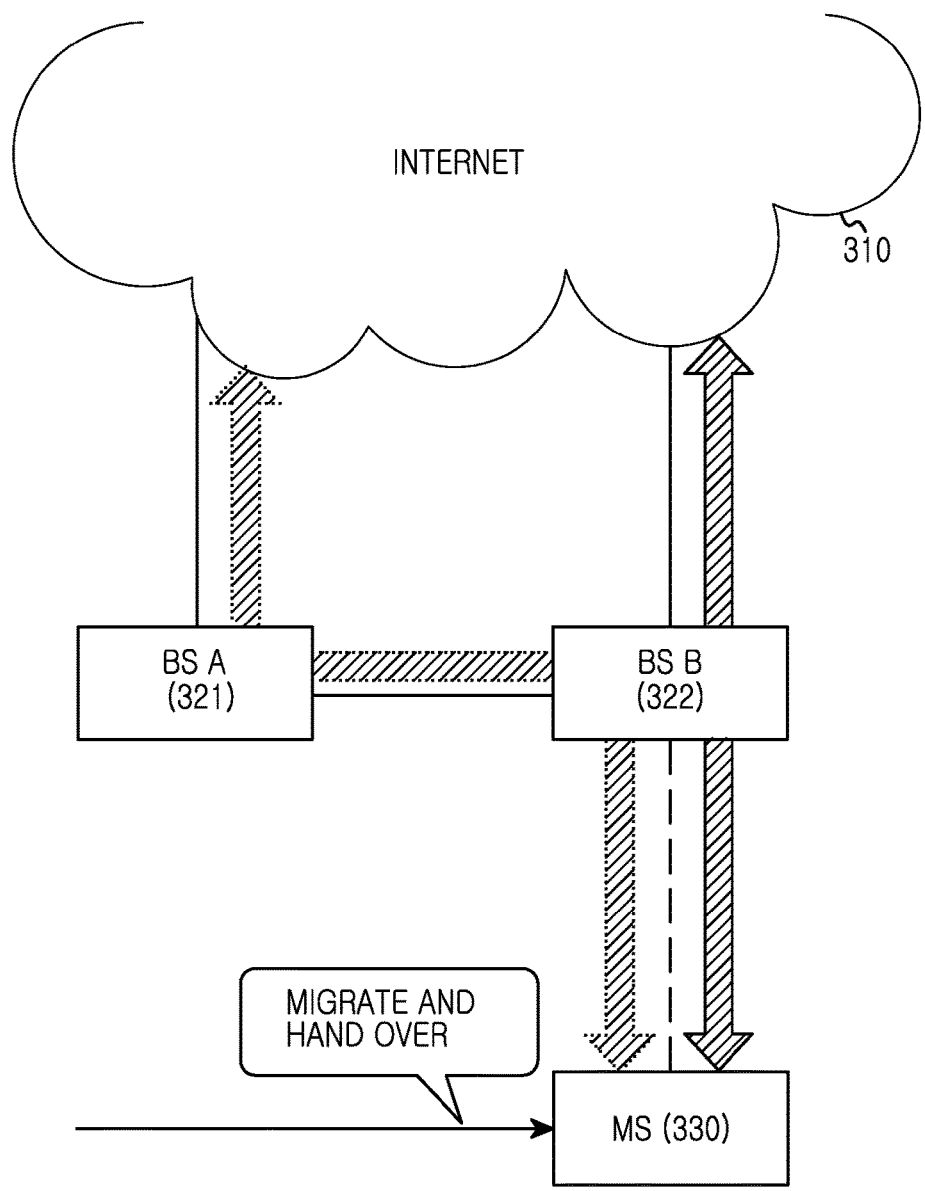
FIG. 3 illustrates mobility management in the wireless communication system according to an embodiment of the present disclosure.

FIG. 3 depicts the mobility management in the wireless communication system according to an embodiment of the present disclosure. FIG. 3 depicts service flow management based on handover of an MS 330.

Referring to FIG. 3, the MS 330 migrates from a cell of a BS A 321 to a cell of a BS B 322 and accordingly hands over from the BS A 321 to the BS B 322. In the process of the handover, the service flow process of the MS 330 differs according to the characteristics of the service flow. Hereafter, to ease the understanding, the MS 330 is assumed to hold two connections of a service flow A 301 and a service flow B 302. It is assumed that the service flow A 301 constantly maintains the connection for seamless service quality in the migration according to the current application characteristics in initial connection establishment, and the service flow B 302 does not need to maintain the service in the migration according to the current application characteristics in the initial connection establishment.

The BS B 322 determines that the service flow A 301 specifies constant maintenance of the connection for seamless service quality to be maintained when the MS 330 moves, based on the flow characteristic information of the flow A 301 in a handover control message received from the BS A 321 in the process of the handover of the MS 330. Next, the BS B 322 sets a data transmission path to the BS A 321 which services the MS 330, and sets the BS A 321 to an anchor on the data transmission path of the flow A 301. Since a delay caused by connection reestablishment in the handover of the service flow A 301 is prevented, and seamless service quality being an application requirement of the service flow A 301 from Internet 310, seamless service quality can be provided.

By contrast, as for the flow B 302, the BS B 322 sets the data transmission path to the BS A 321 and resets the service flow for the flow B 302 in the process of the handover of the MS 330, rather than setting the BS A 321 to the anchor. Thus, it is possible to address signal delay and redundant resource consumption for building the data transmission path to the BS A 321 according to the movement of the MS 330. Also, it is possible to prevent network load and resource waste caused by an inefficient data transmission path when the data transmission path is extended using the BS A 321 as the anchor.

Figure 4:
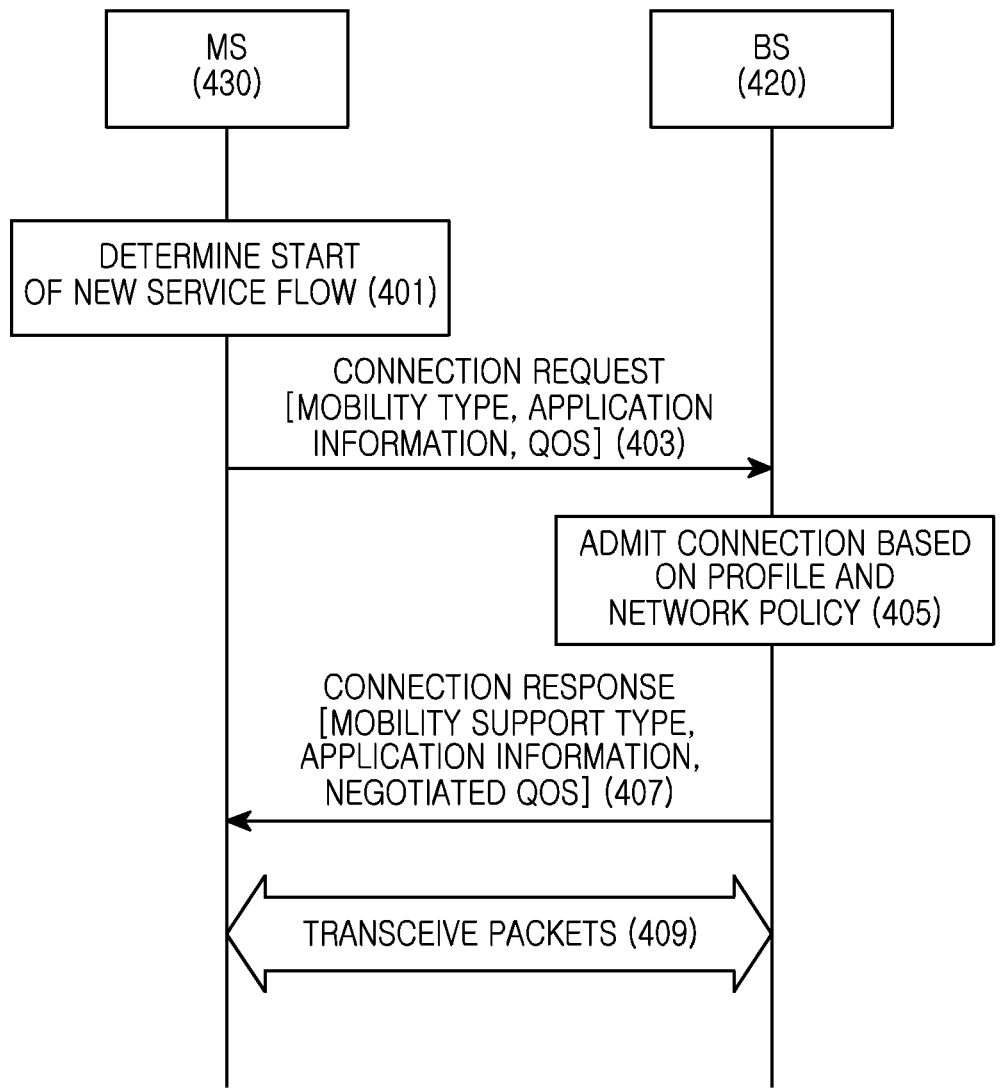
FIG. 4 illustrates signal exchange for the flow setup based on a service type in the wireless communication system according to an embodiment of the present disclosure.

FIG. 4 depicts signal exchange for the connection establishment based on the service type in the wireless communication system according to an embodiment of the present disclosure. FIG. 4 depicts the signal exchange for setting the flow of FIG. 2.

Referring to FIG. 4, an MS 430 determines the start of a new service flow in operation 401. For example, the new service flow can be requested when the user executes a particular application, or by a predefined application. That is, the MS 430 determines whether to set the new service flow according to the request of the higher layer.

In operation 403, the MS 430 transmits a connection request to a BS 420. Herein, the connection request can include mobility type, application information, and Quality of Service (QoS) information. The mobility type indicates handover requirements and processing type of the corresponding connection when the MS 430 migrates as explained in FIG. 2. The mobility type and the application information are basic information for determining whether the connection to establish and the service flow for processing it require the anchor. In so doing, when the BS 420 is not a serving BS of the MS 430, that is, when the MS 430 is not connected to the BS 420, an initial access procedure including ranging and capability negotiation is required in advance.

In operation 405, the BS 420 receiving the connection request determines the corresponding mobility type and whether to access the connection of the application based on the service profile of the MS 430 and a network policy of a network operator. In so doing, it is assumed that the connection is admitted.

In operation 407, the BS 420 transmits a connection response to the MS 430. The connection response includes the negotiated mobility support type, the application information, and the negotiated QoS information. That is, the connection response indicates that the connection establishment is admitted and notifies the permitted mobility type and the QoS information of the connection to establish with the MS 430.

In operation 409, the MS 430 and the BS 420 transmit and receive data packets through the new service flow. In so doing, the BS 420 stores mobility related information (e.g., mobility type, flow type, and application information) of the service flow.

Figure 5:
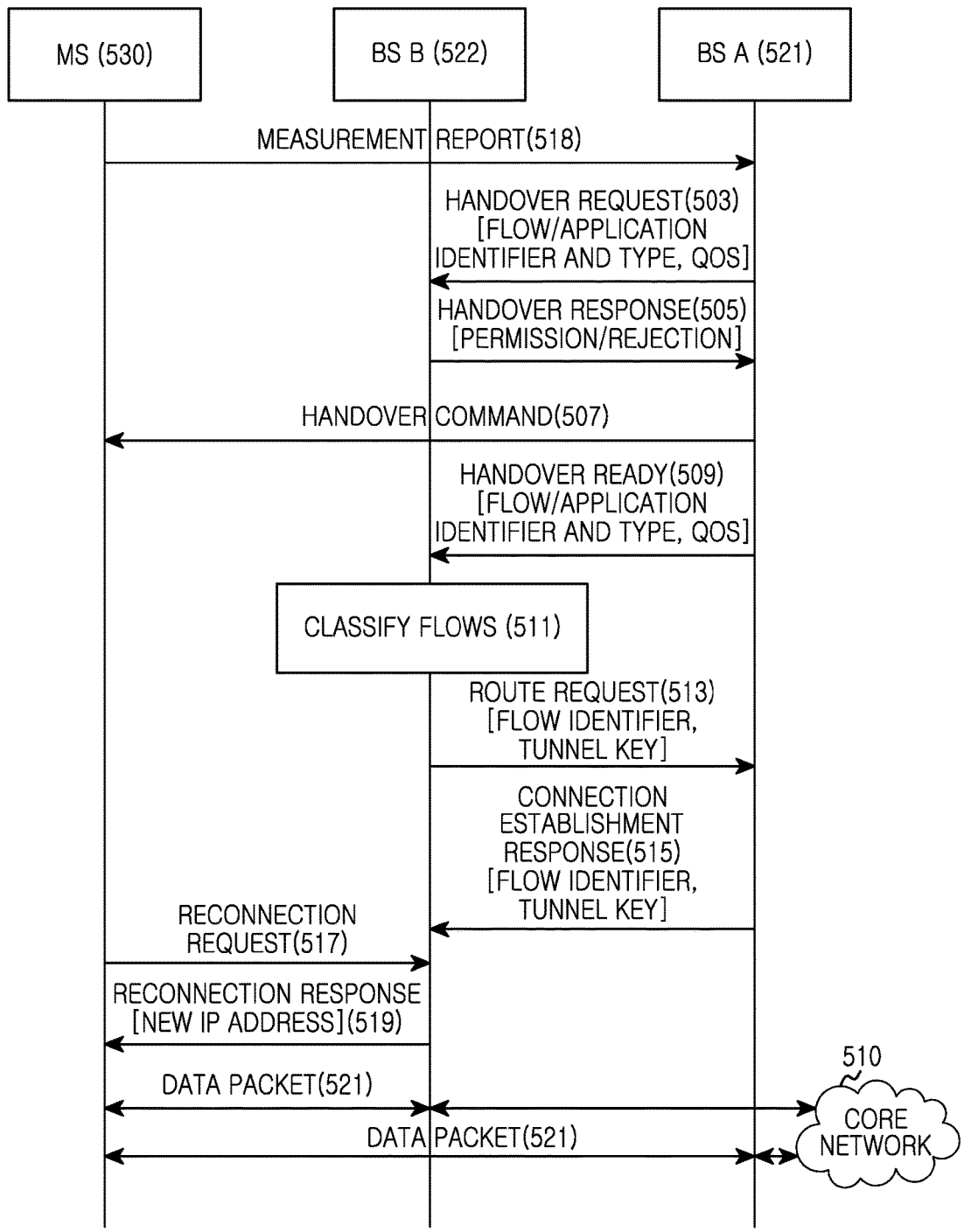
FIG. 5 illustrates signal exchange for the mobility management of MS handover in the wireless communication system according to an embodiment of the present disclosure.

FIG. 5 illustrates signal exchange for the mobility management of the MS handover in the wireless communication system according to an embodiment of the present disclosure. FIG. 5 depicts the signal exchange for supporting the mobility of FIG. 3.

Referring to FIG. 5, an MS 530 transmits a measurement report about the serving BS and at least one neighboring BS to a BS A 521 in operation 501. The measurement report includes a received signal strength of at least one BS. That is, the MS 530 measures the received signal strength using a sync channel, a preamble, and a pilot signal of the at least one BS, and reports the measured received signal strength to the BS A 521 being the serving BS. In so doing, the measurement report includes the received signal strength of a BS B 522.

In operation 503, the BS A 521 receiving the measurement report determines that the handover to the BS B 522 is needed, based on the received signal strength of the measurement report, and transmits a handover request to the BS B 522. The handover request includes a flow/application identifier, a flow/mobility type, a flow/application type, and the QoS information of the MS 530. The necessity of the handover can be determined variously according to various implementations. For example, when the received signal strength of the BS B 522 is greater than the received signal strength of the BS A 521 by a preset threshold, the handover can be determined.

In operation 505, the BS B 522 receiving the handover request transmits a handover response notifying the permission or the rejection to the BS A 521. In so doing, the BS B 522 determines whether to permit or reject the handover through an admission control procedure. For doing so, the BS B 522 can determine whether to admit the handover based on the service profile of the MS 530 and the network policy of the network operator. It is assumed that the handover is permitted.

In operation 507, the BS A 521 confirming the handover admission transmits a handover command to the MS 530. The handover command instructs the handover to the MS 530 and informs that a target BS is the BS B 522.

In operation 509, the BS A 521 transmits a handover ready to the BS B 522. The handover ready includes the flow/application identifier, the flow/mobility type, the flow/application type, and the QoS information of the MS 530. The flow/mobility type and the flow/application type of the handover ready are used to determine whether to set the anchor per service flow. The BS B 522 registers the basic information for determining whether to set the anchor per service flow, for example, the flow/mobility type and the flow/application type.

In operation 511, the BS B 522 divides the service flows of the MS 530 into a flow requiring the anchor and a flow requiring no anchor. Namely, the BS B 522 classifies the service flow defined to constantly maintain the connection for the seamless service quality in the migration and the flow defined not to require the service maintenance in the process of the initial connection establishment. In so doing, the BS B 522 classifies and supports the service flow type for the MS 530 in its capability, based on the flow/mobility type, the flow/application information, the operator policy, and the user profile information. At this time, it is assumed that the flow requiring the anchor and the flow requiring no anchor both exist.

As the flow requiring the anchor is present, the BS B 522 transmits a route request to the BS A 521 in operation 513. The route request is a control message requiring setting the data transmission path between the BSs. The data transmission path can be referred to as a tunnel. The route request includes the service flow identifier and a tunnel key. The service flow identifier indicates the service flow of the route between the BSs, and the tunnel key identifies the route between the BSs.

In operation 515, the BS A 521 receiving the route request, transmits a connection establishment response to the BS B 522. The connection establishment response includes the service flow identifier and the tunnel key. Hence, the tunnel for the service flow requiring the anchor of the MS 530 is built between the BS A 521 and the BS B 522, and the BS A 521 is set to the anchor for the service flow requiring the anchor. When the MS 530 does not hold the service flow requiring the anchor, operation 513 and operation 515 can be omitted.

In operation 517, the MS 530 transmits a reconnection request to the BS B 522 according to the handover command. Since the BS B 522 obtains the service flow information of the MS 530 in operation 509, the reconnection request does not contain the connection information. Yet, in various implementations, the reconnection request can include the flow information.

In operation 519, the BS B 522 receiving the reconnection request transmits a reconnection response to the MS 530. The reconnection response includes an identifier allocated by the BS B 522 to the MS 530 for the identification in the network. For example, when the network is an Internet Protocol (IP) network, the identifier is an IP address. The IP address of the reconnection response is the identifier of the MS 530 used in the service flow set by the BS B 522. Accordingly, when the MS 530 holds only the service flow requiring the anchor, the reconnection response may not include the IP address. That is, the flow requiring the anchor uses the IP address allocated by the BS A 521 being the previous BS. Hence, with both a flow requiring the anchor and a flow requiring no anchor, the MS 530 uses a plurality of IP addresses.

In operation 521, the MS 530 transmits and receives data packets to and from the BS B 522 in the service flows. In the flow requiring no anchor, the BS B 522 itself transmits and receives the data packet. By contrast, in the flow requiring the anchor, the data packet is transmitted and received to and from the core network 510 via the BS A 521. When transmitting and receiving the data packet, Transmission Control Protocol (TCP) renewal can be applied to the flow requiring no anchor.

The TCP renewal is described now. Depending on the type of the application service, the anchor is not used and how to manage the user' session when the service flow is updated, can vary. For example, as the application service using User Datagram Protocol (UDP) manages user session information in the application layer regardless of the IP address change, it is possible to provide the continuous service when the service flow is updated. As the application service using the TCP newly generates a TCP session according to the IP address update in the migration of the MS 530, it can additionally require a function for addressing user session interruption caused by the IP address change in the application service layer. For example, the application service, such as web browsing, can provide the service of the consistent quality as contracted with the user by promptly changing the IP address using the suggested solution in the migration of the MS 530, even when the TCP session is reset according to the IP address change. The TCP renewal generally transmits and receives control signals for establishing the TCP connection between the MS 530 and a server (not shown) which provides the service. Such a process takes a longer time than the handover. Accordingly, it is possible to consider allocating a non-real time service, excluding real-time services, or a service insensitive to the delay, to the service flow requiring no anchor.

Now, operations and structures of the MS and the BS for managing the mobility as described above are elucidated by referring to the drawings.

Figure 6:
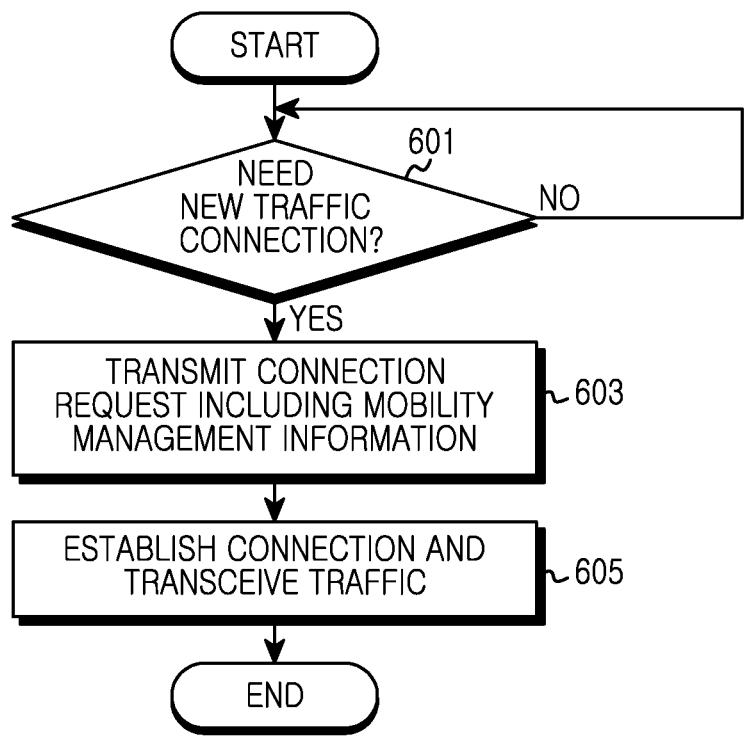
FIG. 6 illustrates connection establishment of an MS in the wireless communication system according to an embodiment of the present disclosure.

FIG. 6 depicts the connection establishment of the MS in the wireless communication system according to an embodiment of the present disclosure.

Referring to FIG. 6, the MS determines whether to generate a new service flow in operation 601. For example, the new service flow can be requested when the user executes a particular application, or by the predefined application. When the MS determines that a new service flow is to be generated ('YES'), in operation 601, begin to generate the new service flow in operation 603. Otherwise, if the MS determines that no new service flow is to be generated ('NO'), in operation 601, the MS continues to determine whether to generate a new service flow.

To generate the new service flow, the MS transmits the connection request including the mobility management information to the serving BS in operation 603. The mobility management information is basic information for determining whether the service flow to be generated by the connection request requires the anchor. For example, the mobility management information can include at least one of the mobility type, the flow type, and the application information. That is, the mobility management information includes at least one of the information directly indicating whether the anchor is needed, the information indicating the flow characteristics, and the information indicating the application characteristics. For example, the mobility management information can be delivered by a message requesting to generate the flow. Yet, when the MS is not accessed to any BS, the MS can further perform the initial access procedure before operation 603.

In operation 605, the MS performs the connection establishment with the serving BS and transceive traffic, that is, transmit and receive the data packets through the generated service flow. When the service BS rejects the request of the MS, operation 605 can be omitted.

Figure 7:
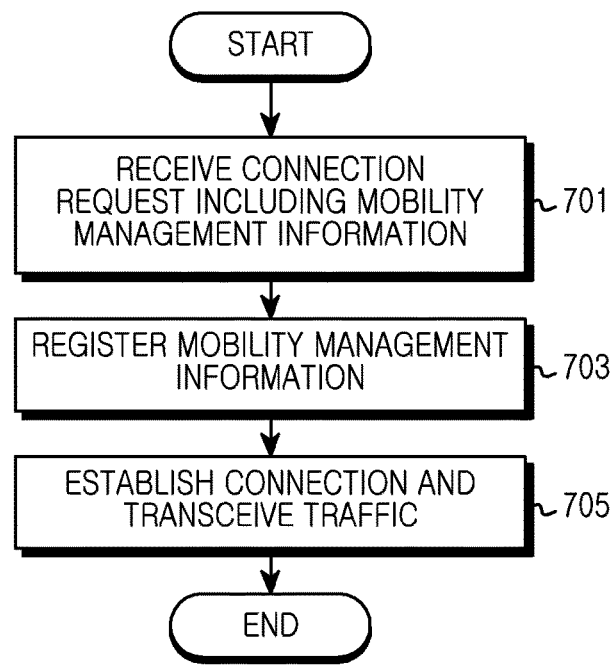
FIG. 7 illustrates connection establishment of a BS in the wireless communication system according to an embodiment of the present disclosure.

FIG. 7 depicts the connection establishment method of the BS in the wireless communication system according to an embodiment of the present disclosure.

Referring to FIG. 7, the BS receives the connection request including the mobility management information from the MS in operation 701. The mobility management information is the basic information for determining whether the service flow to be generated by the connection request requires the anchor. For example, the mobility management information can include at least one of the mobility type, the flow type, and the application information. That is, the mobility management information includes at least one of the information directly indicating whether the anchor is needed, the information indicating the flow characteristics, and the information indicating the application characteristics.

In operation 703, the BS registers the mobility management information. That is, the BS registers the information for determining whether the service flow to be generated by the connection request needs the anchor or the basic information for determining whether the anchor is required. The mobility management information is used to manage the mobility of the service flow when the MS hands over to other BS.

In operation 705, the BS performs the connection establishment with the MS and transceive the traffic, that is, transmit and receive the data packets through the generated service flow. Ahead of operation 703, the BS can determine whether to accept the connection request based on the service profile of the MS and the network policy. When the connection request is rejected, operation 703 and operation 705 can be omitted.

Figure 8:
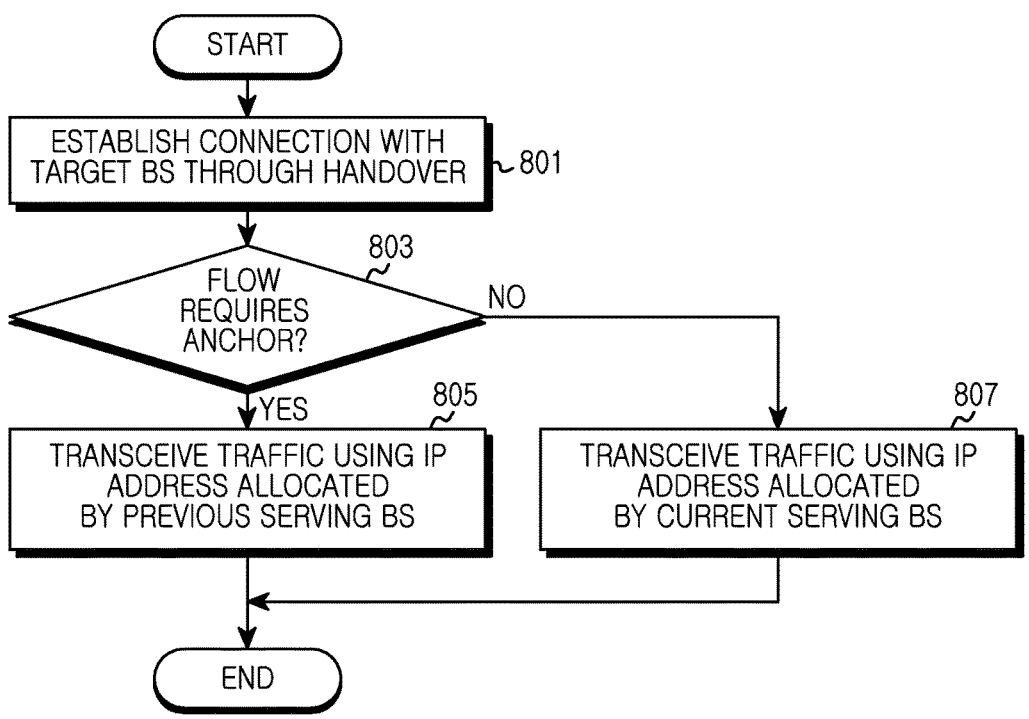
FIG. 8 illustrates the MS handover in the wireless communication system according to an embodiment of the present disclosure.

FIG. 8 illustrates the MS handover in the wireless communication system according to an embodiment of the present disclosure.

Referring to FIG. 8, the MS establishes the connection with the target BS through the handover in operation 801. The handover can differ according to a communication protocol of the present system. For example, the handover can include the measurement report of the MS, the handover command from the serving BS, and the connection establishment with the target BS. In so doing, the MS holds at least one service flow. The serving BS changes according to the handover.

In operation 803, the MS determines whether its service flow requires the anchor. Whether the service flow requires the anchor is determined based on the predefined criterion such as application type of the service flow or flow type.

When the service flow requires the anchor ('YES'), in operation 803, the MS transmits and receives the traffic using the IP address allocated by the previous serving BS in operation 805. That is, the traffic transceived in the flow requiring the anchor is processed using the previous serving BS as the anchor. In other words, the uplink traffic is transmitted to the core network via the previous serving BS, and the downlink traffic is received from the core network via the previous serving BS. Hence, for the flow requiring the anchor, the MS uses the IP address allocated by the previous serving BS.

By contrast, when the service flow requires no anchor ('NO'), in operation 803, the MS transmits and receives the traffic using the IP address allocated by the current serving BS in operation 807. That is, the traffic transceived in the flow requiring no anchor is processed in the new service flow after the handover. In other words, the uplink traffic is transmitted to the core network via the current serving BS, and the downlink traffic is received from the core network via the current serving BS. Hence, for the flow requiring no anchor, the MS uses the IP address allocated by the current serving BS.

When the MS holds the plurality of the service flows, operations 803, 805, and 807 are performed independently for each service flow. That is, when both of the flow requiring the anchor and the flow requiring no anchor exist, the MS classifies the service flows and then conducts operation 805 and 807 individually.

Figure 9:
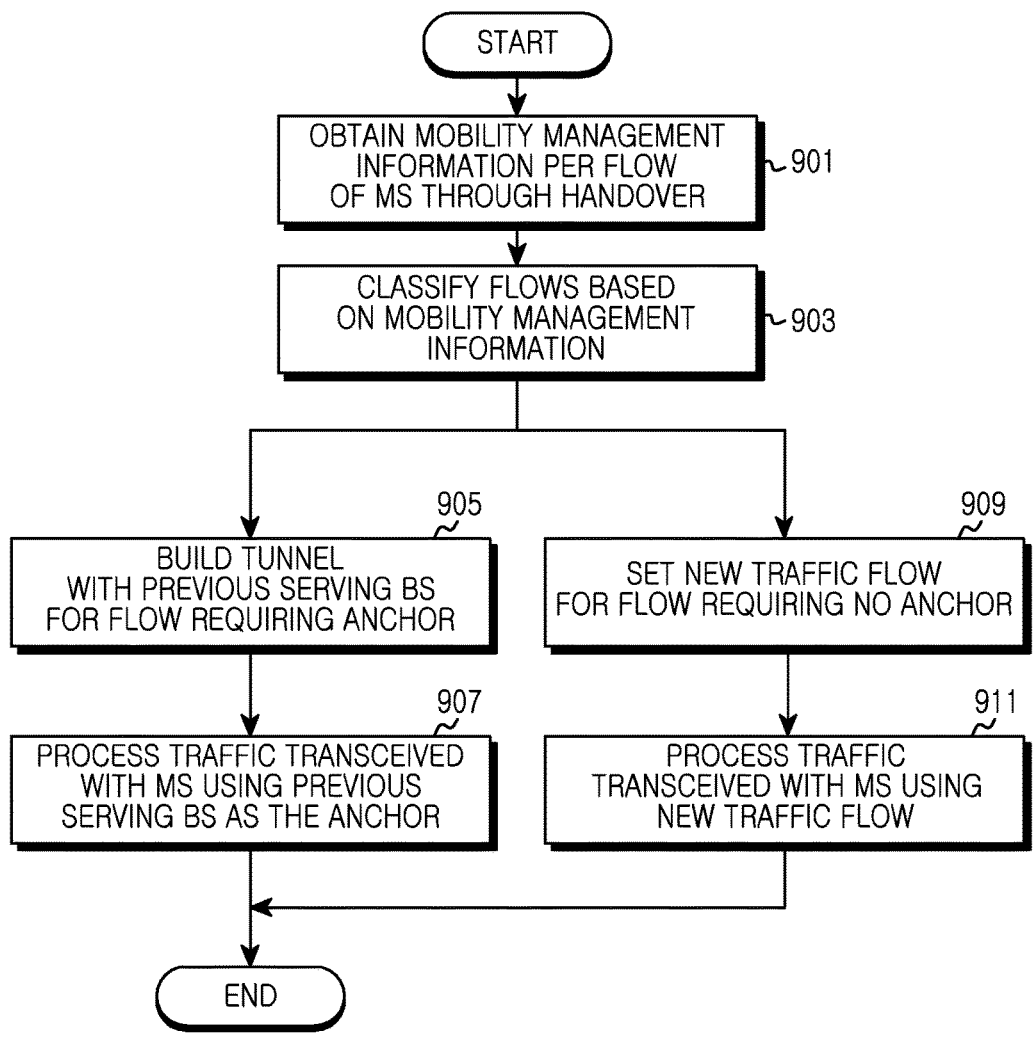
FIG. 9 illustrates the handover of a target BS in the wireless communication system according to an embodiment of the present disclosure.

FIG. 9 illustrates the handover of the target BS in the wireless communication system according to an embodiment of the present disclosure.

Referring to FIG. 9, the BS obtains the mobility management information per flow of the MS through the handover in operation 901. The mobility management information is the basic information for determining whether the service flow of the MS requires the anchor. For example, the mobility management information can include at least one of the mobility type, the flow type, and the application information. In so doing, the BS registers the mobility management information. The handover can differ according to the communication protocol of the present system. For example, the mobility management information can be contained in the handover request message received from the serving BS of the MS.

In operation 903, the BS classifies the service flows to the flow requiring the anchor and the flow requiring no anchor based on the mobility management information. Whether the service flow requires the anchor is determined based on the predefined criterion such as application type of the service flow or flow type. Operations 905 and 907 are applied to the flow requiring the anchor, and operations 909 and 909 are applied to the flow requiring no anchor.

For the flow requiring the anchor, the BS builds the tunnel with the previous serving BS of the MS in operation 905. The traffic transceived in the flow requiring the anchor is processed using the previous serving BS as the anchor. In other words, the uplink traffic in the flow requiring the anchor needs to be transmitted to the previous serving BS, and the downlink traffic needs to be received from the previous serving BS. Thus, the BS generates the tunnel for the flow requiring the anchor.

In operation 907, the BS processes the traffic transceived with the MS using the previous serving BS as the anchor. In other words, the BS transmits the uplink traffic to the core network via the previous serving BS, and receives the downlink traffic from the core network via the previous serving BS. At this time, the traffic transceived in the flow requiring the anchor includes the IP address allocated to the MS by the previous serving BS.

For the flow requiring no anchor, the BS sets the new service flow in operation 909. The traffic transceived in the flow requiring no anchor is processed by the BS itself. In other words, since the flow requiring no anchor does not need the anchor, the BS provides the new service flow. In so doing, the BS allocates a new IP address to the MS.

In operation 911, the BS processes the traffic transceived with the MS through the new service flow. The traffic transceived in the new service flow includes the IP address allocated by the BS.

When the MS holds only the flow requiring the anchor, operations 909 and 911 can be omitted. Alternatively, when the MS holds only the flow requiring no anchor, operations 905 and 907 can be omitted.

Figure 10:
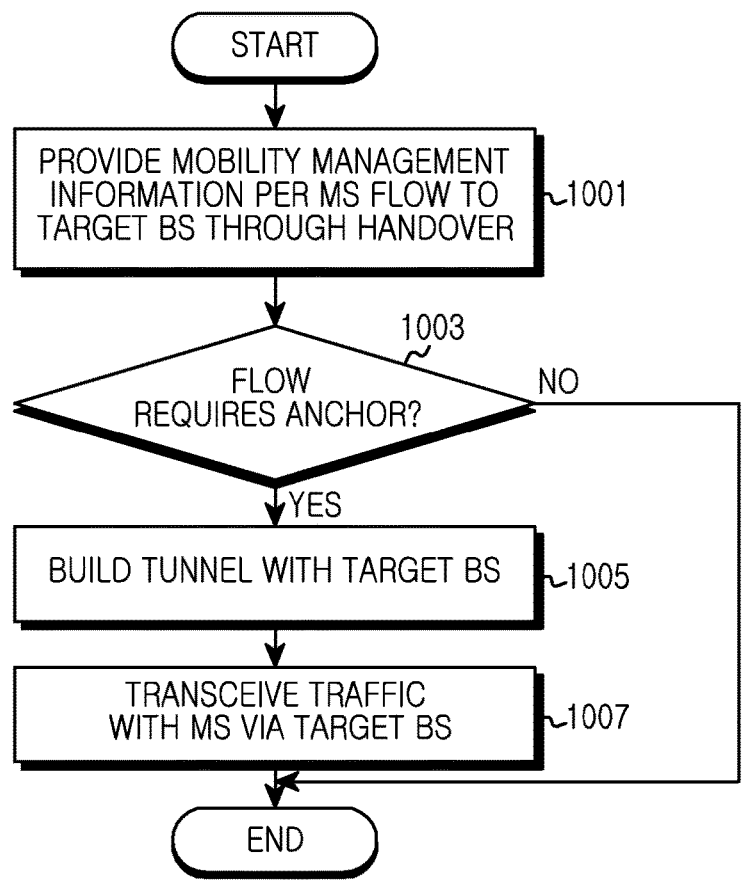
FIG. 10 illustrates the handover of a serving BS in the wireless communication system according to an embodiment of the present disclosure.

FIG. 10 illustrates the handover of the serving BS in the wireless communication system according to an embodiment of the present disclosure.

Referring to FIG. 10, the BS provides the mobility management information per MS flow to the target BS through the handover in operation 1001. The mobility management information is the basic information for determining whether the service flow of the MS requires the anchor. For example, the mobility management information can include at least one of the mobility type, the flow type, and the application information. The handover can differ according to the communication protocol of the present system. For example, the mobility management information can be contained in the handover request message transmitted to the target BS of the MS.

In operation 1003, the BS determines whether the MS handing over to the target BS holds the flow requiring the anchor. Whether the service flow requires the anchor is determined based on the predefined criterion such as application type of the service flow or flow type. When there is no flow requiring the anchor ('NO'), in operation 1003, the BS finishes this process.

When detecting the flow requiring the anchor ('YES'), in operation 1003, the BS builds the tunnel with the target BS in operation 1005. The traffic transceived in the flow requiring the anchor is processed using the previous serving BS, that is, the BS as the anchor. In other words, even when the MS completes the handover, the uplink traffic transceived in the flow requiring the anchor is transmitted to the core network via the BS, and the downlink traffic is received from the BS. Thus, the BS generates the tunnel for the flow requiring the anchor.

In operation 1007, the BS transmits and receives the traffic of the MS via the target BS. That is, the BS receives the uplink traffic via the target BS, that is, the current serving BS and transmits the uplink traffic to the core network. The BS receives the downlink traffic from the core network via the target BS. In so doing, the traffic transceived in the flow requiring the anchor includes the IP address allocated to the MS by the BS.

Figure 11:
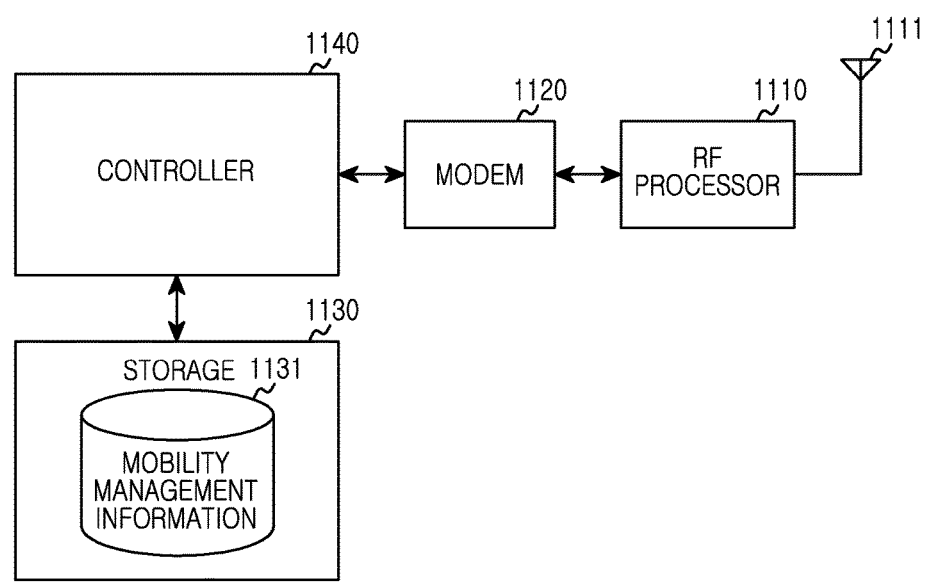
FIG. 11 illustrates the MS in the wireless communication system according to an embodiment of the present disclosure.

FIG. 11 is a block diagram of the MS in the wireless communication system according to an embodiment of the present disclosure.

Referring to FIG. 11, the MS includes a Radio Frequency (RF) processor 1110, a modem 1120, a storage 1130, and a controller 1140.

The RF processor 1110 transmits and receives signals over a radio channel through signal band conversion and amplification. That is, the RF processor 1110 up-converts a baseband signal fed from the modem 1120 to an RF signal, transmits the RF signal over an antenna 1111, and down-converts an RF signal received over the antenna 1111 to a baseband signal. For example, the RF processor 1110 can include an amplifier, a mixer, an oscillator, a Digital Analog Converter (DAC), and an Analog Digital Converter (ADC). While the single antenna 1111 is depicted in FIG. 11, the MS can include a plurality of antennas.

The modem 1120 converts the baseband signal and a bit stream according to a physical layer standard of the system. For example, for the data transmission based on Orthogonal Frequency Division Multiplexing (OFDM), the modem 1120 generates complex symbols by encoding and modulating the transmit bit stream, maps the complex symbols to subcarriers, and generates OFDM symbols using Inverse Fast Fourier Transform (IFFT) and Cyclic Prefix (CP) addition. For the data reception, the modem 1120 splits the baseband signal fed from the RF processor 1110 to OFDM symbols, restores the signals mapped to the subcarriers using FFT, and restores the received bit stream by demodulating and decoding the signals.

The storage 1130 stores a basic program for operating the MS, an application program, and data such as setup information. In particular, the storage 1130 stores the mobility management information 1131 per service flow. The mobility management information 1131 is the basic information for determining whether the service flow requires the anchor. The storage 1130 outputs the stored data according to a request of the controller 1140.

The controller 1140 controls the operations of the MS. For example, the controller 11140 transmits and receives signals through the modem 1120 and the RF processor 1110. The controller 1140 records and reads data to and from the storage 1130. The controller 1140 provides the mobility management information 1131 to the BS for the connection establishment, and differently processes the information according to the mobility characteristics of the service flow after the handover. For example, the controller 1140 controls the MS to perform the methods of FIGS. 6 and 8.

For the service flow generation, the controller 1140 operates as follows. To generate the new service flow, the controller 1140 transmits the connection request including the mobility management information 1131 to the serving BS. The mobility management information 1131 is the basic information for determining whether the service flow to be generated by the connection request requires the anchor. For example, the mobility management information 1131 can include at least one of the information directly indicating whether the anchor is needed, the information indicating the flow characteristics, and the information indicating the application characteristics. For example, the mobility management information 1131 can be delivered by the message requesting the flow generation. Yet, when the MS is not accessed to any BS, the controller 1140 can further perform the initial access procedure.

For the handover, the controller 1140 operates as follows. The controller 1140 establishes the connection with the target BS through the handover. For the service flow requiring the anchor, the controller 1140 transmits and receives the traffic using the IP address allocated by the previous serving BS. That is, the traffic transceived in the flow requiring the anchor is processed using the previous serving BS as the anchor. For the service flow requiring no anchor, the controller 1140 transmits and receives the traffic using the IP address allocated by the current serving BS. That is, the traffic transceived in the flow requiring no anchor is processed in the new service flow after the handover.

Figure 12:
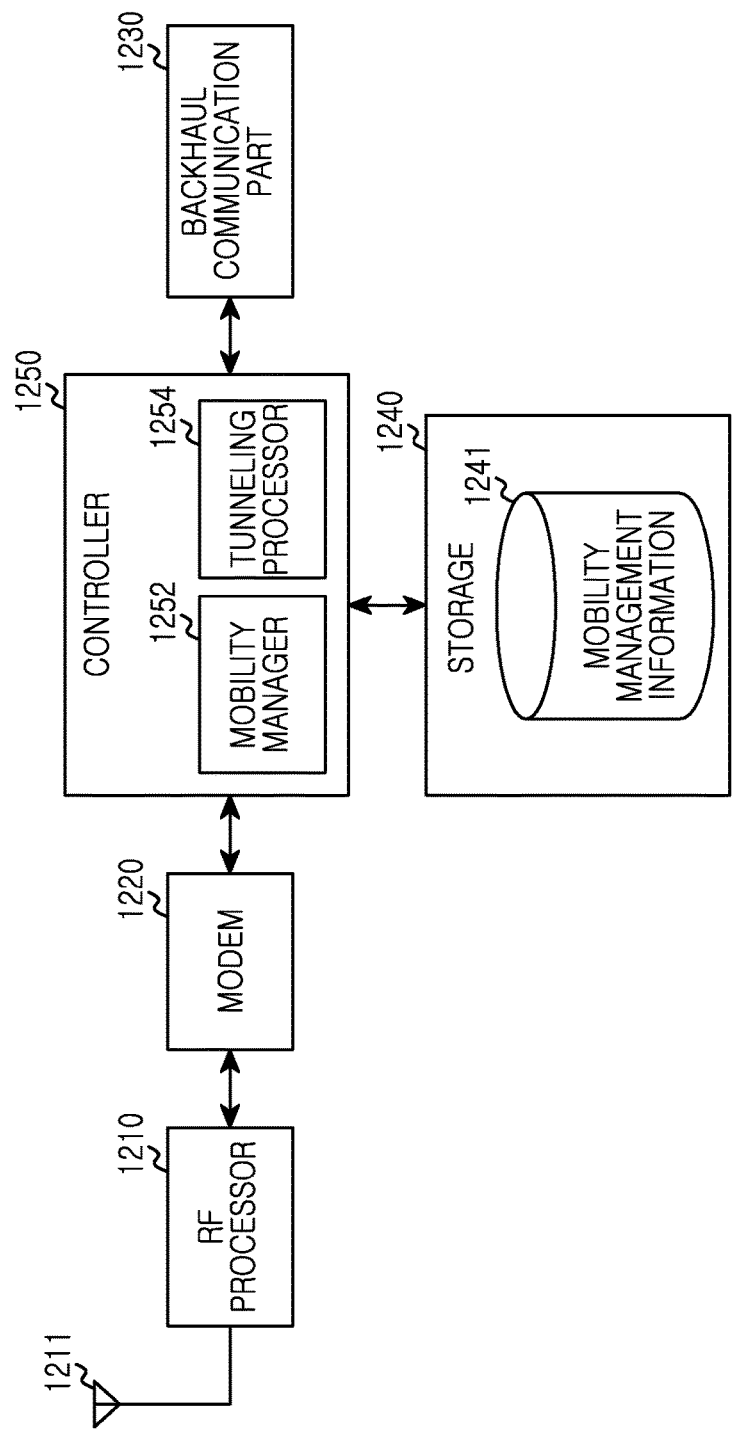
FIG. 12 illustrates the BS in the wireless communication system according to an embodiment of the present disclosure.

FIG. 12 is a block diagram of the BS in the wireless communication system according to an embodiment of the present disclosure.

Referring to FIG. 12, the BS includes an RF processor 1210, a modem 1220, a backhaul communication part 1230, a storage 1240, and a controller 1250.

The RF processor 1210 transmits and receives signals over the radio channel using the signal band conversion and the amplification. That is, the RF processor 1210 up-converts a baseband signal fed from the modem 1220 to an RF signal, transmits the RF signal over an antenna 1211, and down-converts an RF signal received over the antenna 1211 to a baseband signal. For example, the RF processor 1210 can include an amplifier, a mixer, an oscillator, a DAC, and an ADC.

The modem 1220 converts the baseband signal and the bit stream according to the physical layer standard of the system. For example, for the data transmission based on the OFDM, the modem 1220 generates complex symbols by encoding and modulating the transmit bit stream, maps the complex symbols to subcarriers, and generates OFDM symbols using the IFFT and the CP addition. For the data reception, the modem 1220 splits the baseband signal fed from the RF processor 1210 to OFDM symbols, restores the signals mapped to the subcarriers using the FFT, and restores the received bit stream by demodulating and decoding the signals.

The backhaul communication part 1230 provides an interface for communicating with other nodes in the system. That is, the backhaul communication part 1230 converts the bit stream transmitted from the BS to another node, for example, to another BS or the core network, to a physical signal, and converts a physical signal received from the other node to the bit stream. The storage 1240 stores a basic program for operating the BS, an application program, and data such as setup information. In particular, the storage 1240 stores the mobility management information 1241 per service flow. The mobility management information 1241 is the basic information for determining whether the service flow requires the anchor. The storage 1240 outputs the stored data according to a request of the controller 1250.

The controller 1250 controls the operations of the BS. For example, the controller 1240 transmits and receives signals through the modem 1220 and the RF processor 1210, or through the backhaul communication part 1230. The controller 1240 records and reads data to and from the storage 1240. The controller 1250 restores the mobility management information 1241 in the connection establishment, and differently processes the information according to the mobility characteristics of the service flow after the handover. More specifically, the controller 1250 includes a mobility manager 1252 for managing the mobility characteristics of the service flow, and a tunneling processor 1254 for generating and managing the tunnel with the previous serving BS for the flow requiring the anchor. For example, the controller 1250 controls the BS to perform the methods of FIGS. 7, 9, and 10.

For the service flow generation, the controller 1250 operates as follows. The controller 1250 receives the connection request including the mobility management information 1241 from the MS. The mobility management information 1241 is the basic information for determining whether the service flow to be generated by the connection request requires the anchor. For example, the mobility management information 1241 can include at least one of the information directly indicating whether the anchor is needed, the information indicating the flow characteristics, and the information indicating the application characteristics. Next, the controller 1250 registers the mobility management information 1241. That is, the controller 1250 stores to the storage 1240 the information for determining whether the service flow to be generated by the connection request needs the anchor or the basic information for determining whether the anchor is required.

When the MS enters through the handover, that is, when the BS is the target BS, the controller 1250 operates as follows. Referring back to FIG. 9, the controller 1250 obtains the mobility management information 1241 per flow of the MS through the handover, and classifies the service flows to the flow requiring the anchor and the flow requiring no anchor based on the mobility management information 1241. For the flow requiring the anchor, the controller 1250 builds the tunnel with the previous serving BS of the MS and processes the traffic transceived with the MS using the previous serving BS as the anchor. By contrast, for the flow requiring no anchor, the controller 1250 sets the new service flow and processes the traffic transceived with the MS in the new service flow.

When the MS leaves through the handover, that is, when the BS is the serving BS, the controller 1250 operates as follows. The controller 1250 provides the mobility management information 1241 per MS flow to the target BS through the handover. The controller 1250 determines whether the MS handing over holds the flow requiring the anchor. When the flow requires the anchor, the controller 1250 builds the tunnel with the target BS and transceives the traffic of the MS via the target BS.

As set forth above, when the MS migrates in the wireless communication system, the data path is maintained or changed variably based on the serviced traffic type. Thus, the network signal load caused by the frequent handover can be reduced and an optimal route can be set. Therefore, the service quality of the MS is maintained and the system load can be minimized.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a mobile station (MS) in a wireless communication, the method comprising:
   transmitting, to a first base station (BS), a message for generating a service flow, the message comprising information for indicating a type of the service flow;
   performing a handover from the first BS to a second BS, wherein the information is provided to the second BS during the handover;
   after the handover is completed, if the type of the service flow is a first type, communicating traffic of the service flow through a first path by using a first internet protocol (IP) address that is allocated by the first BS; and
   after the handover is completed, if the type of the service flow is a second type, communicating the traffic of the service flow through a second path by using a second IP address that is allocated by the second BS, wherein the first type indicates that the first BS operates as an anchor for the service flow, wherein the second type indicates that the first BS is not needed to operate as the anchor, wherein the first path comprises a wireless channel between the MS and the second BS, a tunnel between the second BS and the first BS and a backhaul link between the first BS and an IP network, and wherein the second path comprises a wireless channel between the MS and the second BS, and a backhaul link between the second BS and the IP network.

2. The method of claim 1, after the handover is completed, if the type of the service flow is a second type, performing a transmission control protocol (TCP) renewal.

3. A method for operating a first base station (BS) in a wireless communication, the method comprising:

receiving a message for generating a service flow, the message comprising information for indicating a type of the service flow, from a mobile station (MS);

performing a handover for the MS from the first BS to a second BS, wherein the information is provided to the second BS during the handover; and after the handover is completed, if the type of the service flow is a first type, communicating traffic of the service flow through a first path by using a first internet protocol (IP) address that is allocated by the first BS, wherein, after the handover is completed, if the type of the service flow is a second type, the traffic of the service flow is communicated through a second path by using a second IP address that is allocated by the second BS, wherein the first type indicates that the first BS operates as an anchor for the service flow, and wherein the second type indicates that the first BS is not needed to operate as the anchor for the service flow, wherein the first path comprises a wireless channel between the MS and the second BS, a tunnel between the second BS and the first BS and a backhaul link between the first BS and an IP network, and wherein the second path comprises a wireless channel between the MS and the second BS, and a backhaul link between the second BS and the IP network.

4. The method of claim 3, wherein the information comprises at least one of information directly indicating whether the type of the service flow is the first type, information indicating characteristics of the service flow, or information indicating characteristics of an application for the service flow.

5. A method for operating a second base station (BS) in a wireless communication, the method comprising:

receiving, from a first BS, information for indicating a type of a service flow generated between the first BS and a mobile station (MS);

performing a handover for the MS from the first BS to the second BS; and after the handover is completed, if the type of the service flow is a first type, communicating traffic of the service flow through a first path by using a first internet protocol (IP) address that is allocated by the first BS; and after the handover is completed, if the type of the service flow is a second type, communicating the traffic of the service flow through a second path by using a second IP address that is allocated by the second BS, wherein the first type indicates that the first BS operates as an anchor for the service flow, wherein the second type indicates that the first BS is not needed to operate as the anchor for the service flow, wherein the first path comprises a wireless channel between the MS and the second BS, a tunnel between the second BS and the first BS and a backhaul link between the first BS and an IP network, and wherein the second path comprises a wireless channel between the MS and the second BS, and a backhaul link between the second BS and the IP network.

6. The method of claim 5, wherein the information comprises at least one of information directly indicating whether the type of the service flow is the first type, information indicating characteristics of the service flow, or information indicating characteristics of an application for the service flow.

7. An apparatus of a mobile station (MS) in a wireless communication, the apparatus comprising:

a transceiver; and at least one processor operatively coupled to the transceiver, wherein the at least one processor is configured to:

transmit, to a first base station (BS), a message for generating a service flow, the message comprising information for indicating a type of the service flow, perform a handover from the first BS to a second BS, wherein the information is provided to the second BS during the handover, after the handover is completed, if the type of the service flow is a first type, communicate traffic of the service flow through a first path by using a first internet protocol (IP) address that is allocated by the first BS, and after the handover is completed, if the type of the service flow is a second type, communicate the traffic of the service flow through a second path by using a second IP address that is allocated by the second BS, wherein the first type indicates that the first BS operates as an anchor for the service flow, wherein the second type indicates that the first BS is not needed to operate as the anchor, wherein the first path comprises a wireless channel between the MS and the second BS, a tunnel between the second BS and the first BS and a backhaul link between the first BS and an IP network, and wherein the second path comprises a wireless channel between the MS and the second BS, and a backhaul link between the second BS and the IP network.

8. An apparatus of a first base station (BS) in a wireless communication, the apparatus comprising:

at least one transceiver; and at least one processor operatively coupled to the transceiver, wherein the at least one processor is configured to:

receive a message for generating a service flow, the message comprising information for indicating a type of the service flow, from a mobile station (MS), perform a handover for the MS from the first BS to a second BS, wherein the information is provided to the second BS during the handover, and after the handover is completed, if the type of the service flow is a first type, communicate traffic of the service flow through a first path by using a first internet protocol (IP) address that is allocated by the first BS, wherein, after the handover is completed, if the type of the service flow is a second type, the traffic of the service flow is communicated through a second path by using a second IP address that is allocated by the second BS, wherein the first type indicates that the BS operates as an anchor for the service flow, wherein the second type indicates that the BS is not needed to operate as the anchor for the service flow, wherein the first path comprises a wireless channel between the MS and the second BS, a tunnel between the second BS and the first BS and a backhaul link between the first BS and an IP network, and wherein the second path comprises a wireless channel between the MS and the second BS, and a backhaul link between the second BS and the IP network.

9. The apparatus of claim 8, wherein the information comprises at least one of information directly indicating whether the type of the service flow is the first type, information indicating characteristics of the service flow, or information indicating characteristics of an application for the service flow.

10. An apparatus of a second base station (BS) in a wireless communication, the apparatus comprising:
at least one transceiver; and
at least one processor operatively coupled to the at least one transceiver,
wherein the at least one processor is configured to:
receive, from a first BS, information for indicating a type of a service flow generated between the first BS and a mobile station (MS),
perform a handover for the MS from the first BS to the second BS,
after the handover is completed, if the type of the service flow is a first type, communicate traffic of the service flow through a first path by using a first internet protocol (IP) address that is allocated by the first BS, and
after the handover is completed, if the type of the service flow is a second type, communicate the traffic of the service flow through a second path by using a second IP address that is allocated by the second BS, wherein the first type indicates that the first BS operates as an anchor for the service flow, wherein the second type indicates that the BS is not needed to operate as the anchor for the service flow, wherein the first path comprises a wireless channel between the MS and the second BS, a tunnel between the second BS and the first BS and a backhaul link between the first BS and an IP network, and wherein the second path comprises a wireless channel between the MS and the second BS, and a backhaul link between the second BS and the IP network.

11. The apparatus of claim 10, wherein the information comprises at least one of information directly indicating whether the type of the service flow is the first type, information indicating characteristics of the service flow, or information indicating characteristics of an application for the service flow.

* * * * *